(12) United States Patent
Weber et al.

(10) Patent No.: US 7,666,070 B2
(45) Date of Patent: Feb. 23, 2010

(54) TOOL HOLDER FOR A DISC-SHAPED WORKING TOOL

(75) Inventors: Christopher Weber, Neuheim (CH); Matthaeus Hoop, Eschen (LI)

(73) Assignee: Hilti Aktiengesellschaft, Schaan (LI)

( * ) Notice: Subject to any disclaimer, the term of this patent is extended or adjusted under 35 U.S.C. 154(b) by 29 days.

(21) Appl. No.: 11/879,844

(22) Filed: Jul. 18, 2007

(65) Prior Publication Data
US 2008/0017007 A1   Jan. 24, 2008

(30) Foreign Application Priority Data
Jul. 20, 2006   (DE)   ........................ 10 2006 000 360

(51) Int. Cl.
 *B24B 41/00* (2006.01)
(52) U.S. Cl. ........................ 451/342; 451/353; 451/358; 451/359
(58) Field of Classification Search ................ 451/342, 451/344, 352, 353, 358, 359; 125/13.01
See application file for complete search history.

(56) References Cited

U.S. PATENT DOCUMENTS

| | | | | |
|---|---|---|---|---|
| 2,572,042 | A * | 10/1951 | Martin | 451/342 |
| 3,656,393 | A * | 4/1972 | Goellner | 83/666 |
| 4,267,759 | A * | 5/1981 | Sullivan et al. | 83/665 |
| 4,870,946 | A | 10/1989 | Long | |
| 5,031,364 | A * | 7/1991 | Belanger | 451/359 |
| 6,042,461 | A * | 3/2000 | Pearson | 451/359 |
| 6,340,022 | B1 * | 1/2002 | Schroer | 125/13.01 |
| 6,796,888 | B2 * | 9/2004 | Jasch | 451/342 |
| 6,811,476 | B2 * | 11/2004 | Ohlendorf | 451/456 |
| 7,144,315 | B1 * | 12/2006 | Sun et al. | 451/541 |
| 7,186,172 | B1 * | 3/2007 | Ohata | 451/342 |
| 2003/0104773 | A1 * | 6/2003 | Krondorfer et al. | 451/342 |
| 2003/0129933 | A1 * | 7/2003 | Wendt et al. | 451/342 |

\* cited by examiner

*Primary Examiner*—Eileen P. Morgan
(74) *Attorney, Agent, or Firm*—Abelman, Frayne & Schwab

(57) ABSTRACT

A tool holder or a disc-shaped working tool (18) has a working tool holding member (14) and a working tool holding counter-member (16) rotatable, together with the working tool holding member, (14) about an operational axis (A) and cooperating with the working tool holding member (14) for receiving therebetween the working tool (18) for joint rotation therewith; central securing element (26) for securing the working tool (18) between the working tool holding member (14) and the working tool holding counter-member (16); and at least one coupling element (44) associated with the working tool holding member (14), radially spaceable from the central securing element (26) and having a rotary stop for forming a releaseable plug-in connection with at least one through-bore (24) formed in the working tool (18).

10 Claims, 3 Drawing Sheets

TOOL HOLDER FOR A DISC-SHAPED WORKING TOOL

BACKGROUND OF THE INVENTION

1. Field of the Invention

The present invention relates to a tool holder for a disc shaped working tool such as, in particular, a cutting disc, e.g., an abrasive cutting disc. The tool holder has a working tool holding member and a counter-member rotatable, together with the working tool holding member, about an operational axis by a motor-driven power tool and cooperating with the working tool holding member for receiving therebetween the working tool for joint rotation therewith. The working tool has a central bore and at least two through-bores spaced from the central bore and each having a sharp-or continuously changing diameter over the bore length, such as, e.g., counter -or step-bores. The working tool holding member has a central opening through which in an assembled condition of the tool holder, a central securing element extends for axially securing the working tool holding member and, thereby, the working tool between the working tool holding member and the working tool holding counter-member. On the working tool holding member, there is further provided at least one coupling element radially spaced from the central opening of the working tool holding member. The at least one coupling element permits to form an eccentric rotary drive with one of the through-bores of the working tool.

2. Description of the Prior Art

Tool holders of the type discussed above provide for two basic types of securing working tool disc. With the first type, the working tool disc is simply secured to the working tool holding member with a single screw forming the central securing element. Here, the working tool disc is clamped form lockingly or frictionally between the working tool holding member and the working tool holding counter-member. The first type of fixation a disc-shaped working tool insure an easy mounting and dismounting of the working tool disc by loosening or tightening the central securing element.

With the second type, the working tool disc is tightly screwed with several screws to that of the working tool holding member and the working tool counter-holding member which is adjacent to a power tool. The heads of the screws are completely received in the counter- or step-bores which are spaced from the central bore of the working tool disc. In this way, no coupling element or elements project in the axial direction on the free side of the working tool disc. The second type of securing the working tool disc permits to provide a flush section parallel to a surface such as, e.g., floor, wall, or ceiling. Further, with this type of attachment, substantially higher torques can be transmitted or applied.

U.S. Pat. No. 4,870,946 discloses a liquid-cooled concrete saw. The saw has a flange-shaped tool holding member with a central opening and several coupling elements spaced from the central opening. The coupling elements include screws with countersunk heads and which are secured in threaded bores. Upon securing a working tool disc, the countersunk heads are received in the corresponding counter-bores of the working tool disc. Alternatively, thereto, an attachment of the working tool disc with an outer bearing plate is contemplated. The bearing plate is held on an output shaft of the concrete saw with a central screw. Thereby, the working tool disc is axially secured between the working tool holding member and the bearing plate. The working tool disc is rotated over a pin that extends from the working tool holding member and engages in an opening of the working tool disc.

With the tool holder of the U.S. Pat. No. 4,870,946, for a normal cutting operation, in order to increase the transmittable torque, besides the attachment with a central screw, an additional attachment of the working tool disc with coupling elements can be used. However, the attachment or detachment of the working tool disc is relatively time-consuming because of the number of screw connections.

Accordingly, an object of the present invention is to provide a tool holder of the type described in which the above-mentioned drawback of the known tool holder is eliminated.

Another object of the present invention is to provide a tool holder of the above-described type which would insure transmission of a high torque between the working tool holding member and disc-shaped working tool together with an easier attachment and detachment of the working tool.

SUMMARY OF THE INVENTION

These and other objects of the present invention, which will become apparent hereinafter, are achieved by providing a tool holder in which the coupling element includes a rotary stop for forming a releasable plug-in connection with at least one through-bore of the working tool.

According to the invention, the rotary stop loosely engages in the through-bore with respect to the operational axis. The axially loose plug-in connection between the coupling elements and the through-bores permits to noticeably increase the torque transmittable between the disc-shaped working tool and the working tool holding member. The rotary stop of the at least one coupling member produces an effective formlocking connection in the rotational direction between the working tool holding member and the working tool disc. Due to a relatively large distance of the formlocking connection to the operational axis, which acts as an effort arm, the formlocking connection permits to obtain a greater torque. Simultaneously, such a tool holder can be easily mounted and dismounted, e.g., in order to replace a worn-out working tool disc. To this end, simply, the central securing means that, e.g., can be formed of a single screw, is released or tightened. The central securing means can be formed either as a mere axial lock or additionally, also as, e.g., a frictional rotary drive. In each case, the central securing means is so formed that the engagement between the coupling elements and the through-bores, which are produced by the loose plug-in connection, secures, in the axial direction, the torques which are produced during a predetermined operation.

According to a particularly preferred embodiment of the invention, the at least one coupling element includes a shaped member, which remains stationary or is removable with respect to the working tool holding member and which is correlated with the one of the through-bores. Thereby, the plug-in connection can be formed substantially backlash-free which provides for a maximized torque transmission to the working tool and prevents unnecessary noise. With correlating shaped body(ies), the corresponding through-bores are completely filed, which partially eliminates weakening of material, which is caused by the through-bores, and increases the stiffness of the working tool. In addition, the shaped body(ies) exactly position(s) the working tool relative to the working tool holding member. This also permits to so arrange the cooling water conducting means of the working tool holding member with respect to the working tool that optimal flow characteristics are obtained.

Advantageously, the through-bores are formed as counter-bores, and the shaped body has, at its free end, a conical section that is correlated with a corresponding counter-bore. Thereby, a plug-in connection can be easily formed between the working tool and the working tool holding member. This is because the shaped body, because of its conical shape, self-centers in the counter-bore, and the entire working tool is precisely positioned relative to the working tool holding member.

Advantageously, the shaped member is formed as a washer securable to the working tool holding member with fastening means.

This insures simple manufacturing of the shaped members and their attachment to the working tool holding members with conventional screws, which reduces manufacturing costs.

Advantageously, the at least one coupling element has a threaded bore in which the shaped member can be tightly screwed. This makes possible to use a working tool holding member without or with different shaped members. Thereby, the working tool holding member can be adapted to different operations or to different work tool discs.

Advantageously, there are provided at least three, preferably six coupling elements, which provides for a uniform torque transmission about the operational axis form the working tool holding member to the working tool.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENT

Figure 1:
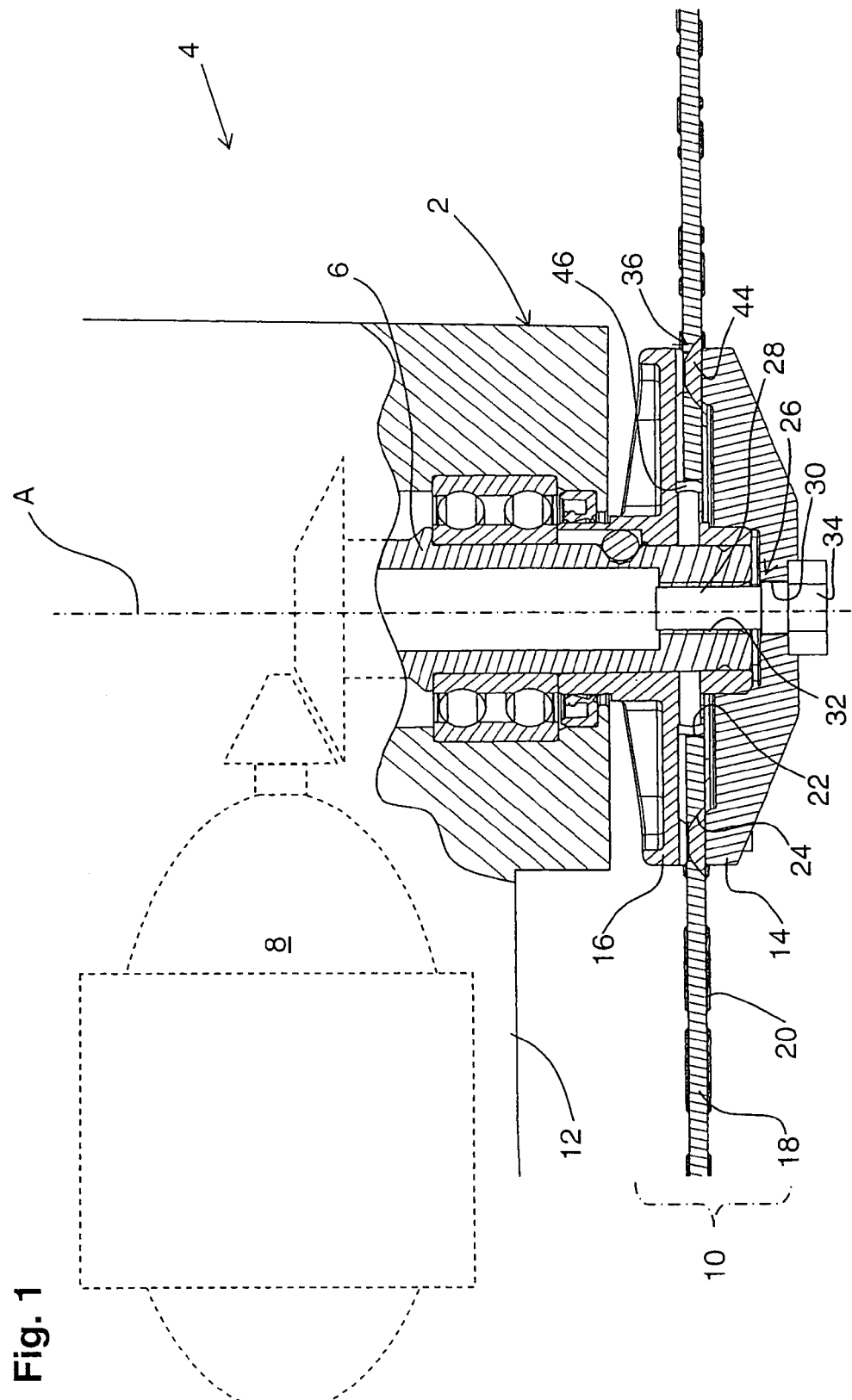
FIG. 1 a cross-sectional view of a head of a power tool with a working tool holder according to the present invention.

FIG. 1 shows a head 2 of a power tool 4 which is formed as an angle grinder. The power tool 4 has spindle-shaped output means 6 rotatable by a motor 8 about an operational axis A. A substantially two-part working tool holder 10 is supported on the output means 6. The working tool holder 10 has a flange-shaped working tool holding member 14 remote from the housing 12 of the power tool 4 and disc-shaped working tool holding counter-member 16 adjacent to the power tool housing 12. As shown in FIG. 1, a disc-shaped working tool 18, in particular an abrasive cutting disc, is secured between the working tool holding member 14 and the working tool holding counter-member 16.

The working tool 18, on which, e.g., diamond-studded cutting segments 20 can be provided, has a central bore 22 and six through-bores 24 radially spaced from the central bore 22. The through-bores 24 are formed as counter-bores the diameter of which is continuously tapered in the direction of the housing 12 in the shown mounted condition of the tool 18. Alternatively, the through-bores 24 can be formed as step-bores (not shown) with a sharp change of the diameter.

In the mounted condition of the working tool 18, securing means, which is generally designated with a reference numeral 26 and which essentially is formed of the output means 6 of the power tool 4 and a central screw 28, projects through the central bore 22. The central screw 28 extends through a central opening 30 of the working tool holding member 14 and through central bore 22 of the working tool 18 and is screwed in a threaded longitudinal bore 32 of the output means 6. The head 34 of the central screw 28 abuts the working tool holding member 14 and presses it against the working tool holding counter-member 16, with interposition of the working tool 18 therebetween.

In this way, the axial position of the working tool holding member 14 and of the working tool 18 itself is secured and, simultaneously, a frictional engagement between working tool disc 18, working tool holding member 14, and the working holding counter-member 16, which insures their joint rotation, is achieved.

In addition, a loose plug-in connection 36 in the axial direction with respect to the operational axis A is formed at each of the through-bores 24.

Figure 2:
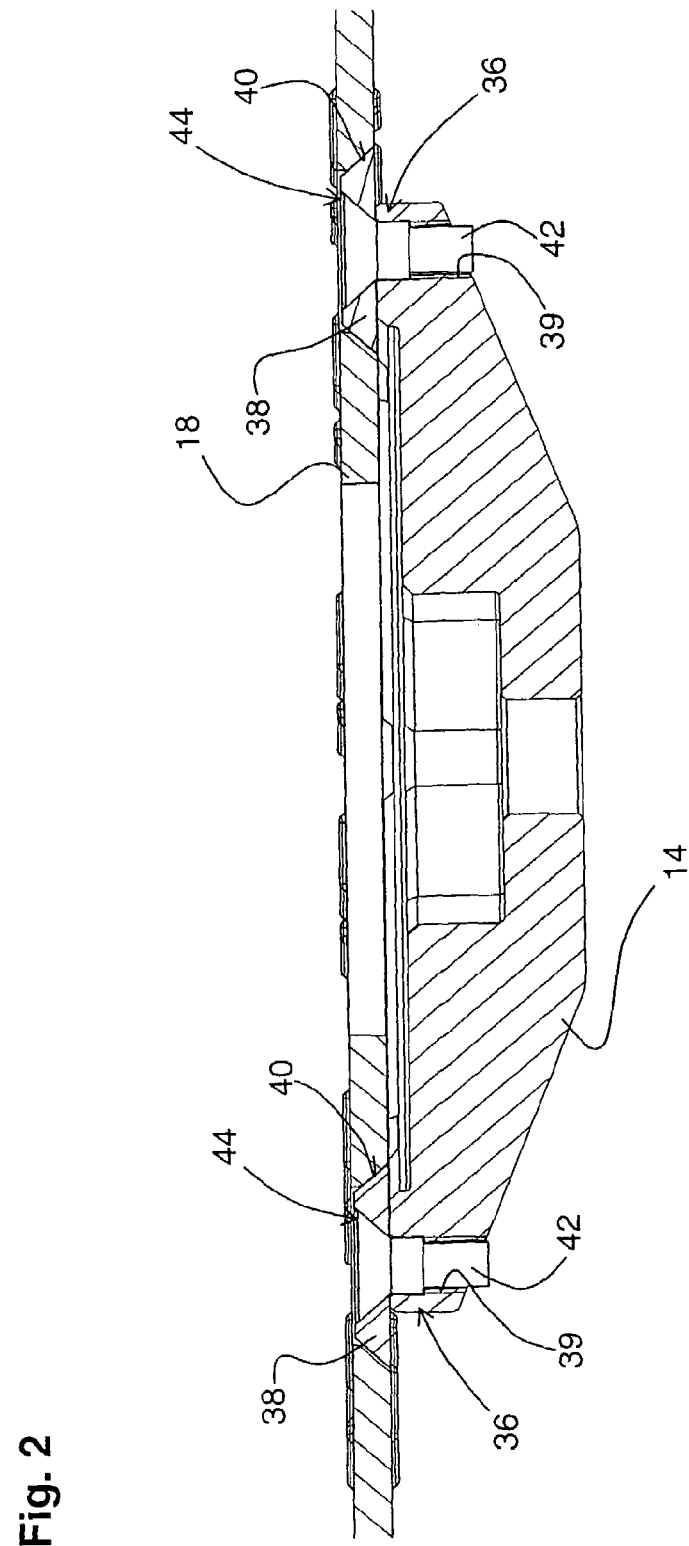
FIG. 2 a cross-sectional view of working tool holding member of the working tool holder according to FIG. 1, together with a working tool disc.
Figure 3:
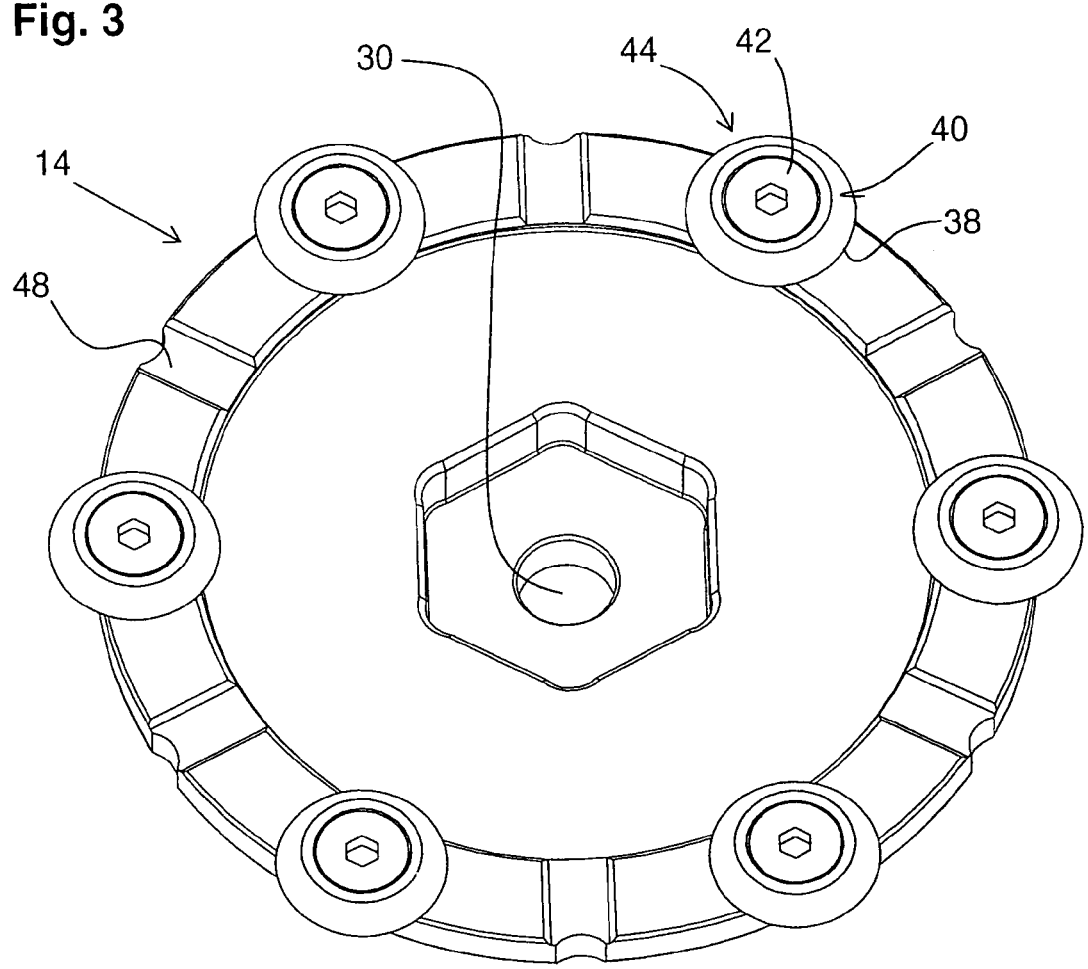
FIG. 3 a perspective view of the working tool holding member according to FIG. 2.

As particularly shown in FIGS. 2 and 3, for forming the plug-in connections 36, there are provided six coupling elements 44 on the working tool holding member 14. Each of the coupling elements 44 has a shaped member 38 with a conical circumferential surface 40, which is formed by a washer, and a screw 42 which is screwed in a threaded bore 39 and which retains the shaped member 38 on the working tool holding member 14, as particularly shown in FIG. 2. In this way the coupling element 44 forms, at its free end, a conical section that tapers in a direction away from the working tool holding member 14.

In their size and arrangement on the working tool holding member 14, the conical circumferential surfaces 40 are adapted to the size and arrangement of through-bores 24 of the working tool 18 and form each a rotary stop. In an operation-ready position of the power tool 4, the coupling elements 44 loosely engage, with these stops, in the axial direction in the through-bores 24 of the working tool 18, forming with it an additional eccentric rotary drive.

For mounting the working tool 18, the central screw 28 is unscrewed from the threaded bore 32, and the working tool holding member 14 is removed from the output means 6. Thereafter, the working tool 18 is placed on the working tool holding counter-member 16. In order to facilitate an exact centralized alignment of the working tool 18, an annular shoulder 46 is provided on the working tool holding counter-member 16. The shoulder 46 has a somewhat smaller diameter than the central bore 22 of the working tool 18. In this way, the working tool 18 is pushed with the central bore 22 onto the annular shoulder 46, centering over the annular shoulder 46 relative to the operational axis A.

As soon as the working tool 18 has been positioned relative to the operational axis A, the working tool holding member 14 is placed on the working tool 18, whereby the coupling elements 44 become engage in the through-bores 24. Thereby, the working tool holding member 14 and the working tool 18 form eccentric plug-in connections 36. The circumferential surfaces 40, which form the rotary stops, formlockingly cooperate with the through-bores 24 in the rotational direction about the operational axis A, providing thereby for a high transferable or receivable torque. The working tool 18 also assumes an exactly predetermined position with respect to the working tool holding member 14. In this position, a plurality of cooling water conducting grooves 48 (see FIG. 3), which extend in the working tool holding member 14 in the radial direction, are so arranged that the cooing flow, which flows along the conducting grooves 48 during an operation, is not disturbed by any contours, such as, e.g., bores, cutting means, of the working tool 18.

Along the operational axis A, the coupling elements 44 loosely engage in the through-bores 24. Therefore, the axial fixation of the working tool 18 and the working tool holding member 14 on the output means 6 is effected only by tightly screwing-in the central screw 28 in the threaded bore 32 of the output means 6.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A tool holder for a disc-shaped working tool (18), comprising:
    a working tool holding member (14) having a central opening (30);
    a working tool holding counter-member (16) rotatable, together with the working tool holding member (14), about an operational axis (A) and cooperating with the working tool holding member (14) for receiving therebetween the working tool (18) for joint rotation therewith;
    central securing means (26) extendable through the central opening (30) of the working tool holding member (14) for securing the working tool (18) between the working tool holding member (14) and the working tool holding counter-member (16); and
    at least three coupling elements (44) associated with the working tool holding member (14), radially spaceable from the central securing means (26) and having a rotary stop for forming a releaseable plug-in connection with at least three through-bores (24) formed in the working tool (18);
    wherein each of the at least three coupling elements (44) comprises, at a respective free end thereof, a shaped member (38) having a first conical section that tapers away in a direction away from the working tool holding member (14); and
    wherein each of the at least three through-bores (24) comprises a shaped body with a second conical section correlated to a respective shaped member (38) for form-lockingly cooperating with a respective one of the at least three coupling elements (44).

2. A tool holder according to claim 1, wherein the shaped member (38) is formed as a washer securable to the working tool holding member (14) with fastening means.

3. A tool holder according to claim 1, wherein the at least three coupling elements (44) have a threaded bore (39) in which the shaped member (38) can be tightly screwed in.

4. A tool holder according to claim 1, wherein the working tool holding member (14) has a central bore (22) with a bore length; and
    wherein the shaped member (38) has a substantially sharp-changing diameter along the bore length.

5. A tool holder according to claim 1, wherein the working tool holding member (14) has a central bore (22) with a bore length; and
    wherein the shaped member (38) has a substantially continuously-changing diameter along the bore length.

6. A tool holder for a disc-shaped working tool (18), comprising:
    a working tool holding member (14) having a central opening (30);
    a working tool holding counter-member (16) rotatable, together with the working tool holding member (14), about an operational axis (A) and cooperating with the working tool holding member (14) for receiving therebetween the working tool (18) for joint rotation therewith;
    central securing means (26) extendable through the central opening (30) of the working tool holding member (14) for securing the working tool (18) between the working tool holding member (14) and the working tool holding counter-member (16); and
    at least one coupling element (44) associated with the working tool holding member (14), radially spaceable from the central securing means (26) and having a rotary stop for forming a releaseable plug-in connection with at least one through-bore (24) formed in the working tool (18), wherein each of the at least one coupling element (44) comprises, at a respective free end thereof, a shaped member (38) having a first conical section that tapers in a direction away from the working tool holding member (14); and
    wherein each of the at least one through-bore (24) comprises a shaped body with a second conical section correlated to a respective shaped member (38) for form-lockingly cooperating with a respective one of the at least three coupling elements (44).

7. A tool holder according to claim 6, wherein the shaped member (38) is formed as a washer securable to the working tool holding member (14) with fastening means.

8. A tool holder according to claim 6, wherein the at least one coupling element (44) has a threaded bore (39) in which the shaped member (38) can be tightly screwed in.

9. A tool holder according to claim 6, comprising at least three coupling elements (44).

10. A tool holder according to claim 6, wherein the at least one through-bore (24) is formed as a counter-bore.

* * * * *

UNITED STATES PATENT AND TRADEMARK OFFICE
CERTIFICATE OF CORRECTION

PATENT NO. : 7,666,070 B2 Page 1 of 1
APPLICATION NO. : 11/879844
DATED : February 23, 2010
INVENTOR(S) : Christoph Weber et al.

It is certified that error appears in the above-identified patent and that said Letters Patent is hereby corrected as shown below:

Title Page, Item (75) should read:
[75]  Inventors: Christoph Weber, Neuheim (CH);
       Matthaeus Hoop, Eschen (LI)

[*] Notice:

The phase "by 29 days" shall reflect as such appears on Letters Patent.

Signed and Sealed this

Ninth Day of November, 2010

David J. Kappos
*Director of the United States Patent and Trademark Office*